United States Patent
Komamine et al.

(10) Patent No.: US 11,830,488 B2
(45) Date of Patent: Nov. 28, 2023

(54) INFORMATION PROCESSING APPARATUS, INFORMATION PROCESSING SYSTEM, NON-TRANSITORY COMPUTER READABLE MEDIUM, AND INFORMATION PROCESSING METHOD

(71) Applicant: TOYOTA JIDOSHA KABUSHIKI KAISHA, Toyota (JP)

(72) Inventors: Satoshi Komamine, Nagoya (JP); Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 17/343,181

(22) Filed: Jun. 9, 2021

(65) Prior Publication Data

US 2022/0005472 A1 Jan. 6, 2022

(30) Foreign Application Priority Data

Jul. 1, 2020 (JP) .................. 2020-114477

(51) Int. Cl.
*G10L 15/22* (2006.01)
*H04L 51/52* (2022.01)

(52) U.S. Cl.
CPC .............. *G10L 15/22* (2013.01); *H04L 51/52* (2022.05); *G10L 2015/223* (2013.01)

(58) Field of Classification Search
CPC ......... G10L 15/22; G10L 15/00; G10L 15/01; G10L 15/06; G10L 15/063; G10L 15/08; G10L 15/18; G10L 15/1815; G10L 15/1822; G10L 15/183; G10L 15/26; G10L 15/28; G10L 15/30; G10L 2015/0631–0638; G10L 2015/221–228; G06F 40/10; G06F 40/20; G06F 40/211; G06F 40/30; G06F 40/35; G06F 40/56
USPC ................ 704/1, 9, 231, 243, 250, 255, 257
See application file for complete search history.

(56) References Cited

U.S. PATENT DOCUMENTS

| | | | |
|---|---|---|---|
| 2015/0058319 A1* | 2/2015 | Miyajima | G06F 16/9535 707/769 |
| 2017/0195629 A1* | 7/2017 | Wexler | H04W 4/029 |
| 2018/0211256 A1* | 7/2018 | Anson | G06Q 20/405 |
| 2020/0134298 A1* | 4/2020 | Zavesky | H04N 7/157 |

FOREIGN PATENT DOCUMENTS

JP 2011-034357 A 2/2011

OTHER PUBLICATIONS

Daiki Murayama et al, "Analysis in Classification of Patterns with Characteristics Extracted from Controversial Statements with Anger of Others", Journal of the Information Processing Society of Japan (Journal), Japan, Information Processing Society of Japan, Feb. 15, 2018, vol. 59 No. 2, p. 429-441.

* cited by examiner

*Primary Examiner* — Qi Han
(74) *Attorney, Agent, or Firm* — Oliff PLC

(57) ABSTRACT

An information processing apparatus includes a controller configured to acquire action data on a plurality of users, extract, from the acquired action data, a particular action that is action data indicating a worsening of a relationship among the plurality of users, and identify a cause pattern that includes at least one piece of action data, among pieces of action data acquired before the particular action, associated with the particular action.

18 Claims, 7 Drawing Sheets

FIG. 4

| | ACTION DATA 1 | ACTION DATA 2 | ACTION DATA 3 |
|---|---|---|---|
| CAUSE PATTERN 1 | USER A REFUSING TO TAKE OUT GARBAGE | USER A PLACING CRUMPLED SOCKS IN WASHING MACHINE | USER B DRINKING BEER |
| CAUSE PATTERN 2 | USER A ASKING FOR LAUNDRY TO BE DONE | USER A ASKING FOR DISHES TO BE WASHED | USER A ASKING FOR CLEANING TO BE DONE |
| ... | ... | ... | ... |

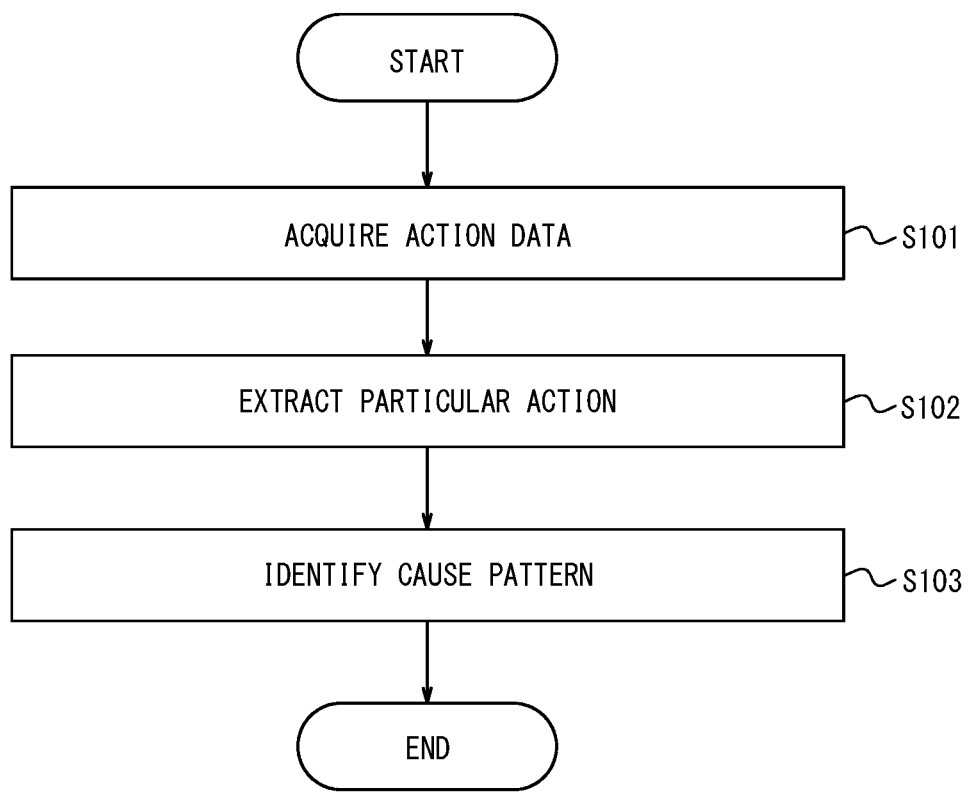

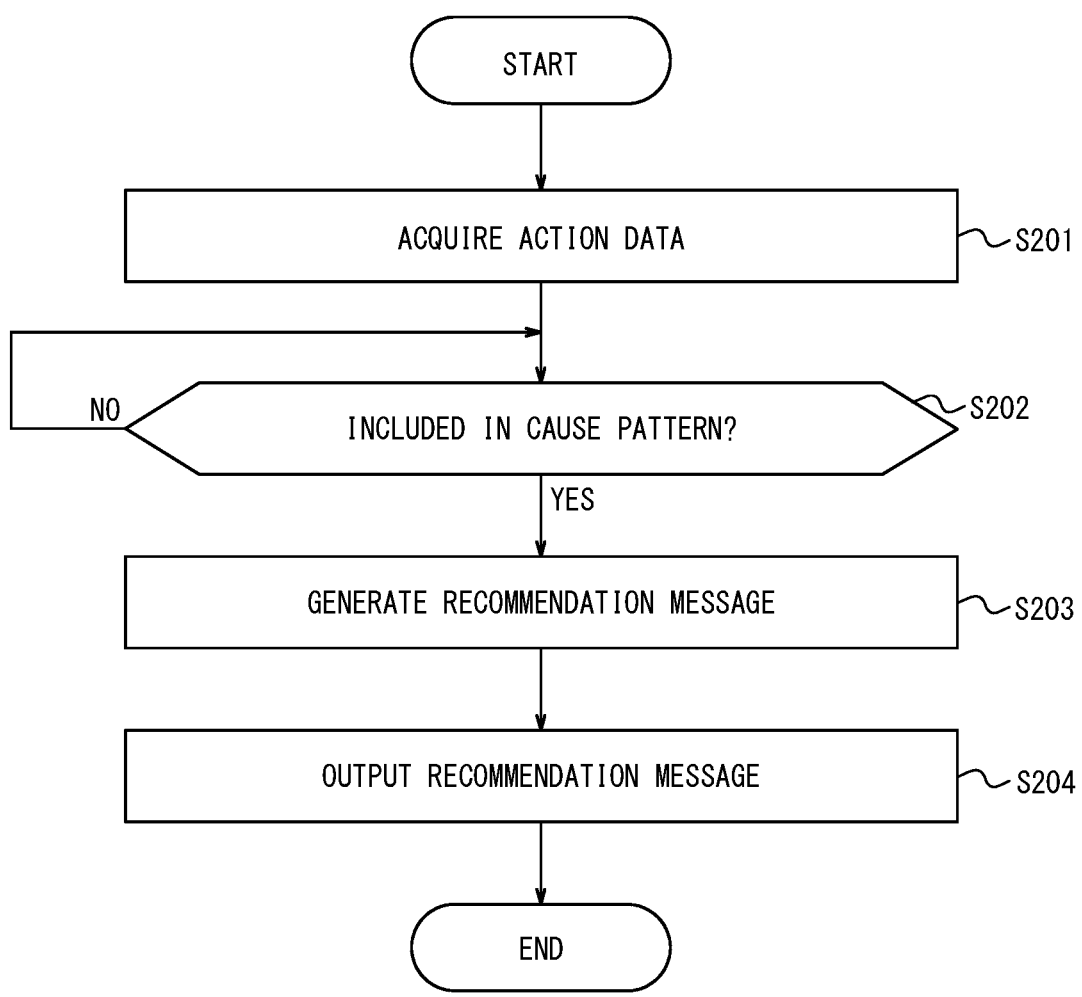

INFORMATION PROCESSING APPARATUS, INFORMATION PROCESSING SYSTEM, NON-TRANSITORY COMPUTER READABLE MEDIUM, AND INFORMATION PROCESSING METHOD

CROSS-REFERENCE TO RELATED APPLICATION

This application claims priority to Japanese Patent Application No. 2020-114477, filed on Jul. 1, 2020, the entire contents of which are incorporated herein by reference.

TECHNICAL FIELD

The present disclosure relates to an information processing apparatus, an information processing system, a program, and an information processing method.

BACKGROUND

Technology for detecting the action of an imaged person based on an image, such as a moving image captured by a camera, is known.

Patent literature (PTL) 1 discloses technology for imaging a subject who has passed through a gate with a camera installed in the gate and judging whether an action of the subject detected based on a captured image is a dangerous action.

CITATION LIST

Patent Literature

PTL 1: JP 2011-034357 A

SUMMARY

For example, it would be useful to identify actions that cause a worsening of the relationship among a plurality of users living in the same residence based on images captured by a camera, or the like. This could prevent worsening of the relationship among the plurality of users.

It would be helpful to identify actions that lead to a worsening of the relationship among a plurality of users.

An information processing apparatus according to the present disclosure includes a controller configured to:
acquire action data on a plurality of users;
extract, from the acquired action data, a particular action that is action data indicating a worsening of a relationship among the plurality of users; and
identify a cause pattern that includes at least one piece of action data, among pieces of action data acquired before the particular action, associated with the particular action.

A program according to the present disclosure is configured to cause a computer to execute operations including:
acquiring action data on a plurality of users;
extracting, from the acquired action data, a particular action that is action data indicating a worsening of a relationship among the plurality of users; and
identifying a cause pattern that includes at least one piece of action data, among pieces of action data acquired before the particular action, associated with the particular action.

An information processing method according to the present disclosure is an information processing method for an information processing apparatus, the information processing method including:
acquiring action data on a plurality of users;
extracting, from the acquired action data, a particular action that is action data indicating a worsening of a relationship among the plurality of users; and
identifying a cause pattern that includes at least one piece of action data, among pieces of action data acquired before the particular action, associated with the particular action.

According to the present disclosure, actions that lead to a worsening of the relationship among a plurality of users can be identified.

BRIEF DESCRIPTION OF THE DRAWINGS

In the accompanying drawings:

FIG. 4 is a diagram illustrating examples of cause patterns;

FIG. 6 is a flowchart illustrating operations of an information processing system according to an embodiment of the present disclosure; and FIG. 7 is a flowchart illustrating operations of an information processing system according to an embodiment of the present disclosure.

DETAILED DESCRIPTION

Embodiments of the present disclosure are described below with reference to the drawings.

Figure 1:
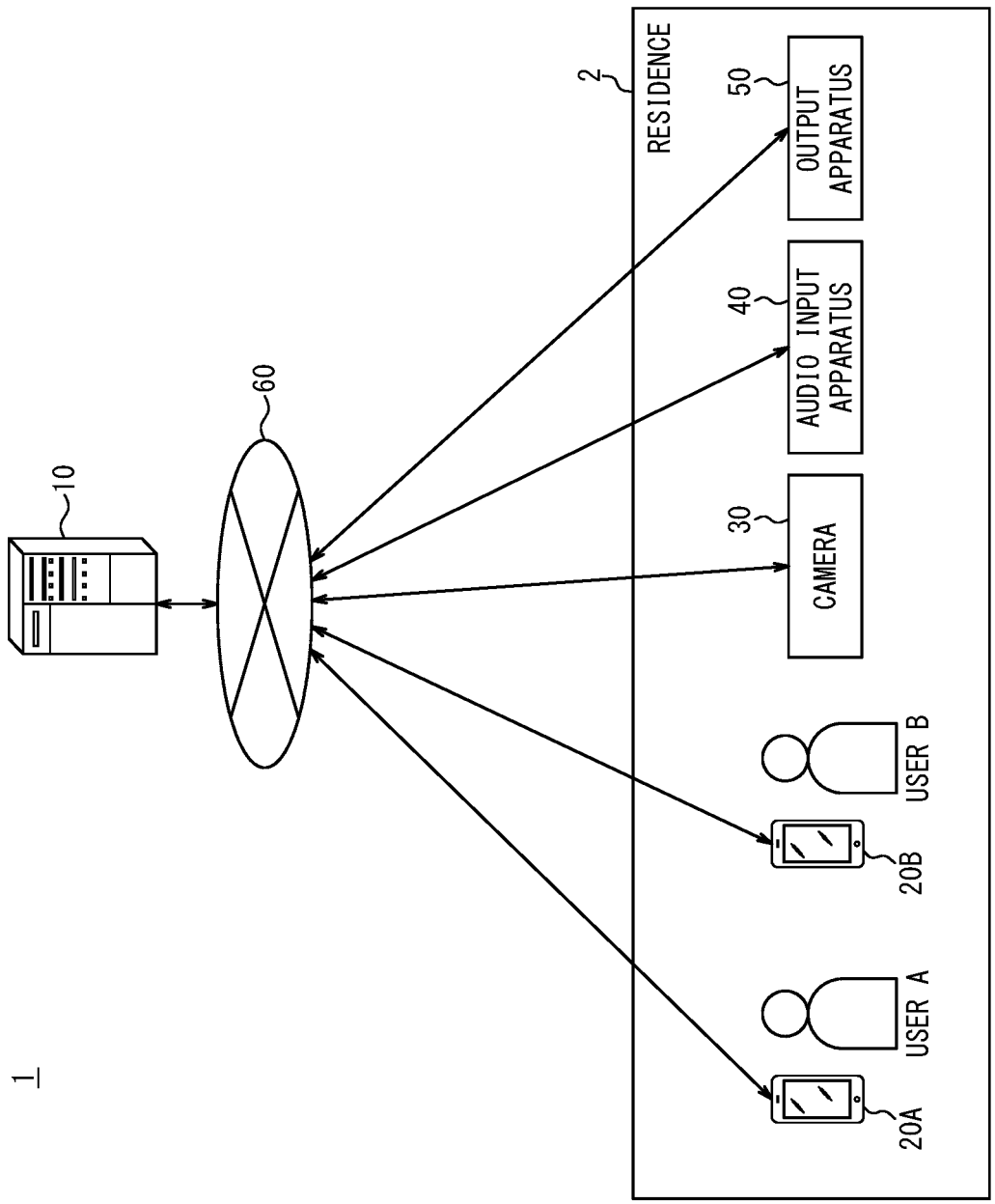
FIG. 1 is a diagram illustrating a configuration of an information processing system according to an embodiment of the present disclosure.

FIG. 1 is a diagram illustrating a configuration of an information processing system 1 according to an embodiment of the present disclosure. The configuration and outline of the information processing system 1 according to an embodiment of the present disclosure are described with reference to FIG. 1.

The information processing system 1 includes an information processing apparatus 10, a terminal apparatus 20A, a terminal apparatus 20B, a camera 30, an audio input apparatus 40, and an output apparatus 50. The information processing apparatus 10, the terminal apparatus 20A, the terminal apparatus 20B, the camera 30, the audio input apparatus 40, and the output apparatus 50 are communicably connected via a network 60. The network 60 may be a network including a mobile communication network, the Internet, and the like.

As illustrated in FIG. 1, the camera 30, the audio input apparatus 40, and the output apparatus 50 are installed in a residence 2. In the present embodiment, the residence 2 is described as an example of a building, but the residence 2 may be a different type of building. For example, the residence 2 may be a building used in other applications, such as a shop or an office.

In the present embodiment, user A and user B are described as being in the residence 2 as an example. The terminal apparatus 20A is a terminal apparatus owned by user A in the residence 2. The terminal apparatus 20B is a terminal apparatus owned by user B in the residence 2. When no distinction need be made in the following description, the terminal apparatus 20A and the terminal apparatus 20B are simply referred to as the "terminal apparatus 20". Furthermore, when no distinction need be made, user A and user B are simply referred to as the "user".

In FIG. 1, one each of the information processing apparatus 10, the camera 30, the audio input apparatus 40, and the output apparatus 50 are illustrated, but the number of information processing apparatuses 10, cameras 30, audio input apparatuses 40, and output apparatuses 50 may be two or more of each.

FIG. 1 illustrates the case of two users, user A and user B, in the residence 2, but any number of users may be present in the residence 2. When each user owns one terminal apparatus 20, the number of terminal apparatuses 20 matches the number of users.

The information processing apparatus 10 is, for example, a dedicated computer configured to function as a server. The information processing apparatus 10 may be a general-purpose personal computer (PC).

The information processing apparatus 10 can communicate with the terminal apparatuses 20, the camera 30, the audio input apparatus 40, and the output apparatus 50 via the network 60.

The information processing apparatus 10 acquires action data on a plurality of users in the residence 2 from the terminal apparatuses 20, the camera 30, and the audio input apparatus 40. The action data is data related to user actions. The action data includes image data yielded by imaging users, audio data yielded by detecting the voice in a conversation among the users, and/or social networking service (SNS) data posted by the users.

The information processing apparatus 10 acquires image data, from the camera 30, yielded by the camera 30 imaging the users in the residence 2. The image data may be still image data or moving image data.

The information processing apparatus 10 acquires audio data, from the audio input apparatus 40, yielded by the audio input apparatus 40 detecting a conversation of the users in the residence 2.

The information processing apparatus 10 acquires SNS data posted by the users in the residence 2 from the terminal apparatuses 20. Alternatively, the information processing apparatus 10 may acquire the SNS data posted by the users from an external server that stores the SNS data posted by the users in the residence 2.

The information processing apparatus 10 extracts, from the acquired action data on the users, a particular action indicating a worsening of the relationship among the plurality of users. In the following description, the "particular action" refers to an action that indicates a worsening of the relationship among the plurality of users. Particular actions include, for example, actions indicating that an argument has occurred among the plurality of users, actions indicating that a quarrel has occurred among the plurality of users, and the like.

The information processing apparatus 10 may use various criteria to judge that the acquired action data on a user is a particular action and extract the particular action. For example, when detecting that action data containing audio data includes words likely used to swear strongly at the other party, the information processing apparatus 10 may judge that an argument has occurred among the plurality of users and judge that the action data is a particular action.

Upon extracting a particular action, the information processing apparatus 10 identifies a cause pattern that includes a combination of pieces of action data associated with the particular action among the action data acquired before the particular action. The cause pattern may include a combination of a plurality of pieces of action data. Each time a cause pattern is identified, the information processing apparatus 10 stores the identified cause pattern.

Upon acquiring action data corresponding to the action data included in a previously stored cause pattern, the information processing apparatus 10 generates a message that recommends avoiding a worsening of the relationship among the plurality of users, i.e., avoiding the triggering of a particular action. In the following description, the message that recommends avoiding the triggering of a particular action is also referred to as a "recommendation message".

The information processing apparatus 10 transmits the generated recommendation message to the terminal apparatus 20A or the terminal apparatus 20B for the terminal apparatus 20A or the terminal apparatus 20B to output the recommendation message. The information processing apparatus 10 may transmit the recommendation message to both the terminal apparatus 20A and the terminal apparatus 20B for both the terminal apparatus 20A and the terminal apparatus 20B to output the recommendation message. The information processing apparatus 10 may transmit the generated recommendation message to the output apparatus 50 for the output apparatus 50 to output the recommendation message.

The terminal apparatus 20 can communicate with the information processing apparatus 10 via the network 60. The terminal apparatus 20 is a terminal apparatus owned by a user in the residence 2. The terminal apparatus 20 receives recommendation messages from the information processing apparatus 10. The terminal apparatus 20 outputs the received recommendation messages. The terminal apparatus 20 may output a recommendation message as audio. The terminal apparatus 20 may output a recommendation message as an image. The terminal apparatus 20 may vibrate prior to outputting a recommendation message to draw the user's attention to the terminal apparatus 20. The terminal apparatus 20 may, for example, be a smartphone or a tablet.

The camera 30 can communicate with the information processing apparatus 10 via the network 60. The camera 30 continuously images the users in the residence 2. The camera 30 transmits captured image data to the information processing apparatus 10.

The audio input apparatus 40 can communicate with the information processing apparatus 10 via the network 60. The audio input apparatus 40 continuously detects the conversation of the users in the residence 2. The audio input apparatus 40 transmits the detected audio data to the information processing apparatus 10. The audio input apparatus 40 may, for example, be a microphone.

The output apparatus 50 can communicate with the information processing apparatus 10 via the network 60. The output apparatus 50 receives recommendation messages from the information processing apparatus 10. The output apparatus 50 outputs the received recommendation messages. The output apparatus 50 includes a speaker and/or a display. The output apparatus 50 may output a recommendation message as audio. The output apparatus 50 may output a recommendation message as an image. The output apparatus 50 can output audio, images, and the like as information that can be perceived by both of the users in the residence 2.

Figure 2:
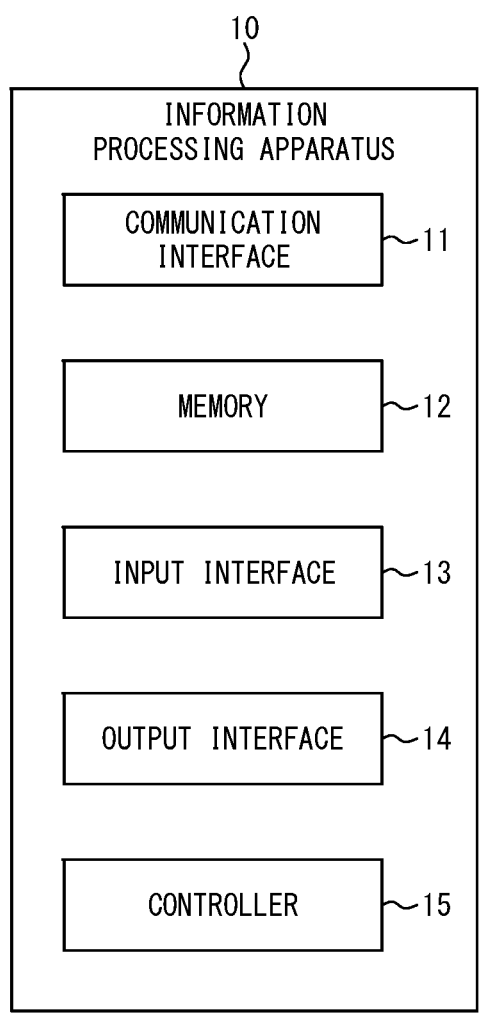
FIG. 2 is a block diagram illustrating a configuration of an information processing apparatus according to an embodiment of the present disclosure.

A configuration of the information processing apparatus 10 according to an embodiment of the present disclosure is described with reference to FIG. 2.

The information processing apparatus 10 includes a communication interface 11, a memory 12, an input interface 13, an output interface 14, and a controller 15.

The communication interface 11 includes a communication module that connects to the network 60. For example, the communication interface 11 may include a communication module corresponding to a local area network (LAN). In an embodiment, the information processing apparatus 10 is connected to the network 60 via the communication interface 11. The communication interface 11 transmits and receives various information via the network 60. The communication interface 11 can communicate with the terminal apparatus 20, the camera 30, the audio input apparatus 40, and the output apparatus 50 via the network 60.

The memory 12 is, for example, a semiconductor memory, a magnetic memory, an optical memory, or the like, but is not limited to these. The memory 12 may, for example, function as a main memory, an auxiliary memory, or a cache memory. The memory 12 stores any information used for operations of the information processing apparatus 10. For example, the memory 12 may store a system program, an application program, various types of information received by the communication interface 11, and the like. The information stored in the memory 12 may be updated with information received from the network 60 via, for example, the communication interface 11. A portion of the memory 12 may be installed externally to the information processing apparatus 10. In this case, the externally installed portion of the memory 12 may be connected to the information processing apparatus 10 via any appropriate interface.

The input interface 13 includes one or more input interfaces for detecting user input and acquiring input information based on user operation. For example, the input interface 13 includes, but is not limited to, a physical key, a capacitive key, a touch screen integrally provided with a display of the output interface 14, or a microphone that receives audio input.

The output interface 14 includes one or more output interfaces for outputting information to notify the user. For example, the output interface 14 includes, but is not limited to, a display for outputting information as images or a speaker for outputting information as audio.

The controller 15 includes at least one processor, at least one dedicated circuit, or a combination thereof. The processor is a general-purpose processor, such as a central processing unit (CPU) or a graphics processing unit (GPU), or a dedicated processor specialized for a particular process. The dedicated circuit is, for example, a field-programmable gate array (FPGA) or an application specific integrated circuit (ASIC). The controller 15 executes processes related to the operations of the information processing apparatus 10 while controlling each component of the information processing apparatus 10.

Figure 3:
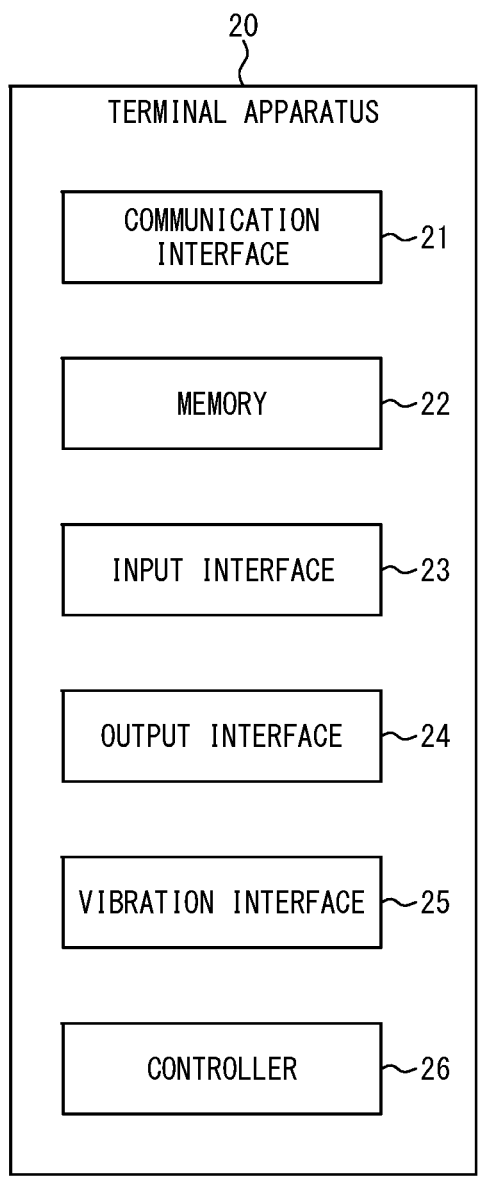
FIG. 3 is a block diagram illustrating a configuration of a terminal apparatus according to an embodiment of the present disclosure.

A configuration of the terminal apparatus 20 according to an embodiment of the present disclosure is described with reference to FIG. 3.

The terminal apparatus 20 includes a communication interface 21, a memory 22, an input interface 23, an output interface 24, a vibration interface 25, and a controller 26.

The communication interface 21 includes a communication module that connects to the network 60. For example, the communication interface 21 may include a communication module compliant with mobile communication standards such as LTE, 4G and 5G. In an embodiment, the terminal apparatus 20 is connected to the network 60 via the communication interface 21. The communication interface 21 transmits and receives various information via the network 60. The communication interface 21 can communicate with the information processing apparatus 10 via the network 60.

The memory 22 is, for example, a semiconductor memory, a magnetic memory, an optical memory, or the like, but is not limited to these. The memory 22 may, for example, function as a main memory, an auxiliary memory, or a cache memory. The memory 22 stores any information used for operations of the terminal apparatus 20. For example, the memory 22 may store a system program, an application program, various types of information received by the communication interface 21, and the like. The information stored in the memory 22 may, for example, be updated with information received via the network 60 via the communication interface 21. A portion of the memory 22 may be installed externally to the terminal apparatus 20. In this case, the externally installed portion of the memory 22 may be connected to the terminal apparatus 20 via any appropriate interface.

The input interface 23 includes one or more input interfaces for detecting user input and acquiring input information based on user operation. The input interface 23 may be a physical key, a capacitive key, a touch screen integrally provided with a display of the output interface 24, or a microphone that receives audio input, but is not limited to these examples.

The output interface 24 includes one or more output interfaces for outputting information to notify the user. For example, the output interface 24 includes, but is not limited to, a display for outputting information as images or a speaker for outputting information as audio.

The vibration interface 25 includes a vibration mechanism that can vibrate the entire terminal apparatus 20. The vibration interface 25 may, for example, include an eccentric weight, a motor, and the like.

The controller 26 includes at least one processor, at least one dedicated circuit, or a combination thereof. The processor is a general-purpose processor, such as a CPU or a GPU, or a dedicated processor specialized for a particular process. The dedicated circuit is, for example, an FPGA or an ASIC. The controller 26 executes processes related to the operations of the terminal apparatus 20 while controlling each component of the terminal apparatus 20.

(Operations of Information Processing System)

Operations of the information processing system 1 illustrated in FIG. 1 are described with reference to FIGS. 1 to 3.

The camera 30 installed in the residence 2 continuously images the users in the residence 2. The camera 30 transmits the captured image data as action data on the users to the information processing apparatus 10.

The audio input apparatus 40 installed in the residence 2 continuously detects the conversation of the users in the residence 2. The audio input apparatus 40 transmits the detected audio data as action data on the users to the information processing apparatus 10.

When a user in residence 2 posts SNS data, terminal apparatus 20 owned by the user transmits the posted SNS data as action data on the user to the information processing apparatus 10. The terminal apparatus 20 may transmit the SNS data to an external server managing the SNS data.

The communication interface 11 of the information processing apparatus 10 receives the image data transmitted by the camera 30 as action data on the users. The controller 15 acquires the image data transmitted by the camera 30 as action data on the users via the communication interface 11. The controller 15 analyzes the acquired image data and recognizes which user is engaging in what kind of action. For example, the controller 15 analyzes images and recognizes that user A is drinking beer.

The communication interface 11 receives the audio data transmitted by the audio input apparatus 40 as action data on the users. The controller 15 acquires the audio data transmitted by the audio input apparatus 40 as action data on the users via the communication interface 11. The controller 15 analyzes the acquired audio data and recognizes which users have had what type of conversation. The controller 15 recognizes, for example, that user A has uttered a request that user B do the laundry. The controller 15 may recognize the user who made the utterance based on features of the audio data or by analyzing the image data acquired from the camera 30 at the time of the utterance.

The communication interface 11 receives the SNS data transmitted by the terminal apparatus 20 as the action data on the user. The controller 15 acquires the SNS data transmitted by the terminal apparatus 20 as action data on the user via the communication interface 11. The controller 15 analyzes the acquired SNS data and recognizes which user has posted what kind of comment. For example, the controller 15 recognizes that user A has posted a comment about not feeling well.

<Extraction of Particular Action and Identification of Cause Pattern>

The controller 15 extracts a particular action indicating that the relationship among the plurality of users has worsened from the action data on the plurality of users acquired from the camera 30, the audio input apparatus 40, and the like. For example, when detecting that action data containing audio data includes words likely used to swear strongly at the other party, the controller 15 judges that an argument has occurred among the plurality of users, judges that the action data is a particular action, and extracts the particular action.

Upon extracting a particular action, the controller 15 analyzes the action data acquired before the particular action was extracted and identifies a combination of pieces of action data that can be associated with the particular action. The combination, identified in this way, of action data that can be associated with a particular action is referred to in the present embodiment as a "cause pattern."

Upon concluding, by analysis, that there is a combination of pieces of action data frequently acquired prior to a certain particular action, the controller 15 identifies the combination of pieces of action data as a cause pattern.

For example, when the probability of a particular action being triggered is equal to or greater than a predetermined threshold after a combination of pieces of action data is acquired, the controller 15 may identify the combination of pieces of action data as a cause pattern. The predetermined threshold may, for example, be 70%.

FIG. 4 illustrates examples of cause patterns. The cause patterns 1 and 2 illustrated in FIG. 4 are cause patterns associated with the particular action that "user A and user B are arguing". The cause patterns 1 and 2 each include a combination of three pieces of action data.

The cause pattern 1 is a combination of the following three pieces of action data.

Action data 1: user A refusing to take out the garbage
Action data 2: user A placing crumpled socks in the washing machine
Action data 3: user B drinking beer The cause pattern 1 indicates that acquisition by the controller 15 of the above three pieces of action data 1 to 3 will likely subsequently lead to the particular action of "user A and user B are arguing". For example, even if the actions corresponding to the action data 1 and the action data 2 occur, it may be unlikely to lead subsequently to a particular action if the action corresponding to the action data 3 does not occur. In such a case, identifying the combination of the action data 1 to 3 as the cause pattern 1 enables a more accurate association between actions of the users and the particular action.

The cause pattern 2 is a combination of the following three pieces of action data.

Action data 1: user A asking for laundry to be done
Action data 2: user A asking for dishes to be washed
Action data 3: user A asking for cleaning to be done The cause pattern 2 indicates that acquisition by the controller 15 of the above three pieces of action data 1 to 3 will likely subsequently trigger the particular action of "user A and user B are arguing". For example, even if the actions corresponding to the action data 1 and the action data 2 occur, it may be unlikely to lead subsequently to a particular action if the action corresponding to the action data 3 does not occur. In such a case, identifying the combination of the action data 1 to 3 as the cause pattern 2 enables a more accurate association between actions of the users and the particular action.

When the controller 15 identifies a cause pattern associated with a particular action, the controller 15 stores the identified cause pattern in the memory 12.

The controller 15 may store the cause pattern in the memory 12 as data that depends on the order of the action data or may store the cause pattern in the memory 12 as data that does not depend on the order of the action data.

For example, when the cause pattern 1 illustrated in FIG. 4 is stored in the memory 12 as data depending on the order of the action data, the controller 15 judges that a combination in which the order of the action data 1 and the action data 3 is interchanged is unlikely to trigger the particular action. For example, when the cause pattern 1 illustrated in FIG. 4 is stored in the memory 12 as data independent of the order of the action data, the controller 15 judges that a combination of the action data 1 to 3 in any order is likely to trigger a particular action.

The controller 15 may store the cause pattern in the memory 12 in a format such that the action data is generalized. For example, when storing the cause pattern 2 illustrated in FIG. 4 in the memory 12, the controller 15 may store the cause pattern 2 in the form of "user A asks three times for housework to be done". In this case, the controller 15 judges that three requests by the user A for housework are likely to trigger the particular action.

The controller 15 may identify the cause pattern in association with time and store the cause pattern in the memory 12 in a format associated with time. For example, if the combination of the action data 1 to 3 illustrated as the cause pattern 2 in FIG. 4 is likely to trigger the particular action when occurring within a predetermined time range, the combination of the action data 1 to 3 may be identified as a cause pattern in association with the predetermined time range.

<Generation and Output of Recommendation Message>

Upon acquiring the action data, the controller 15 judges whether the acquired action data is the action data included in a cause pattern that has already been stored in the memory 12. When the controller 15 judges that the acquired action data is included in a cause pattern already stored in the memory 12, the controller 15 generates a message that recommends avoiding a worsening of the relationship among the plurality of users.

The controller 15 may generate a recommendation message at the stage when the acquired action data corresponds to a portion of the action data included in a cause pattern. For example, if the cause pattern is a combination of three pieces of action data, the controller 15 may generate a recommendation message at the stage when one or two pieces of the action data are acquired.

Alternatively, the controller 15 may generate a recommendation message at the stage when all of the plurality of pieces of action data included in a cause pattern are acquired. For example, if the cause pattern is a combination of three pieces of action data, the controller 15 may generate a recommendation message at the stage when all three pieces of action data are acquired. The stage at which the recommendation message is generated may, for example, be a settable value.

The controller 15 transmits the generated recommendation message to the terminal apparatus 20 via the communication interface 11. The controller 15 transmits the generated recommendation message to, for example, the terminal apparatus 20 owned by the user engaging in the action corresponding to the action data included in the cause pattern. For example, when the action data included in the cause pattern 2 illustrated in FIG. 4 is acquired, the controller 15 transmits a recommendation message to the terminal apparatus 20 owned by the user A.

The communication interface 21 of the terminal apparatus 20 receives the recommendation message transmitted by the information processing apparatus 10. The controller 26 acquires the recommendation message transmitted by the information processing apparatus 10 via the communication interface 21.

Upon acquiring the recommendation message, the controller 26 controls the vibration interface 25 to vibrate the entire terminal apparatus 20. By vibrating the terminal apparatus 20, the controller 26 can encourage the user of the terminal apparatus 20 to direct their attention to the terminal apparatus 20.

The controller 26 causes the output interface 24 to output the recommendation message. The controller 26 may cause the output interface 24 to display the recommendation message as an image or to output the recommendation message as audio.

Figure 5:
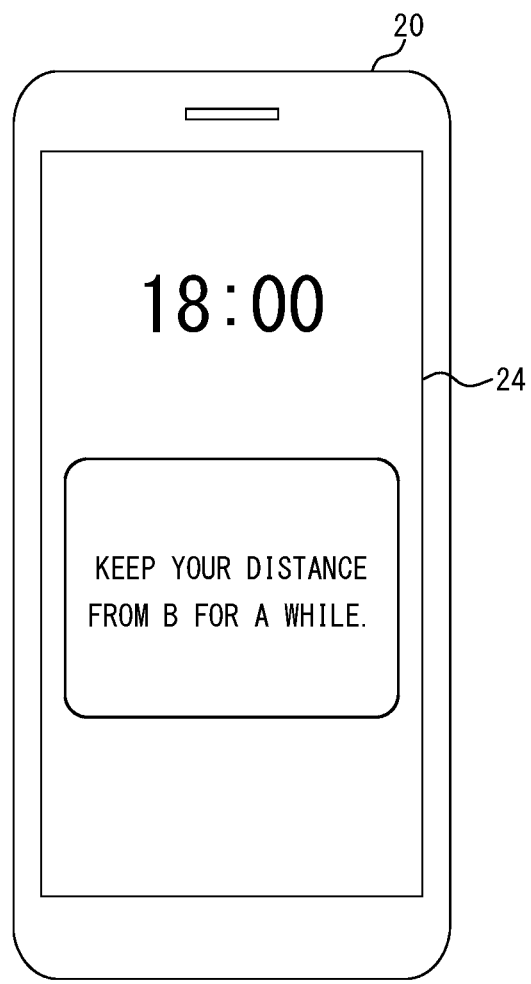
FIG. 5 is a diagram illustrating an example of a recommendation message.

FIG. 5 illustrates an example in which the terminal apparatus 20 displays a recommendation message on the output interface 24 stating "keep your distance from B for a while". By user A keeping their distance from user B for a while after seeing the recommendation message, the probability of triggering the particular action in which user A and user B argue can be reduced.

Although an example in which the controller 15 transmits the recommendation message to one terminal apparatus 20 for output has been described, the controller 15 may transmit the recommendation message to both terminal apparatuses 20 and cause both terminal apparatuses 20 to output the recommendation message.

Alternatively, the controller 15 may transmit the recommendation message to the output apparatus 50 for output. The message outputted by the output apparatus 50 can be recognized by a plurality of users. In this case, both users therefore recognize the message outputted by the output apparatus 50. By both users taking the action recommended by the recommendation message, the probability of triggering the particular action in which user A and user B argue can be reduced.

Operations of the information processing system 1 are described with reference to the flowcharts in FIGS. 6 and 7.

FIG. 6 is a flowchart illustrating processing for the information processing system 1 to identify a cause pattern. FIG. 7 is a flowchart illustrating processing for the information processing system 1 to generate and output a recommendation message.

First, the processing for the information processing system 1 to identify the cause pattern is described with reference to the flowchart in FIG. 6.

In step S101, the controller 15 of the information processing apparatus 10 acquires action data on a plurality of users in the residence 2. The controller 15 acquires the action data on the plurality of users in the residence 2 from the camera 30, the audio input apparatus 40, and the like.

In step S102, the controller 15 extracts a particular action, indicating that the relationship among the plurality of users has worsened, from the action data on the users acquired from the camera 30, the audio input apparatus 40, and the like.

Upon extracting a particular action, the controller 15 analyzes the action data that was acquired before the extracted particular action was acquired and identifies a cause pattern in step S103. The controller 15 stores the identified cause pattern in the memory 12.

Subsequently, the processing for the information processing system 1 to generate and output a recommendation message is described with reference to the flowchart in FIG. 7. The processing illustrated in FIG. 7 is performed in a state such that at least one cause pattern has been stored in the memory 12 of the information processing apparatus 10 by the processing illustrated in FIG. 6.

In step S201, the controller 15 of the information processing apparatus 10 acquires the action data on a plurality of users in the residence 2. The information processing apparatus 10 acquires the action data on the plurality of users in the residence 2 from the camera 30, the audio input apparatus 40, and the like.

In step S202, the controller 15 judges whether the acquired action data is the action data included in a cause pattern that has already been stored in the memory 12.

When it is judged that the acquired action data is not included in a cause pattern, i.e., when step S202 is judged to be NO, the controller 15 repeats the processing of step S202. When it is judged that the acquired action data is included in a cause pattern, i.e., when step S202 is judged to be YES, the controller 15 proceeds to step S203.

In step S203, the controller 15 generates a recommendation message that recommends avoiding a worsening of the relationship among the plurality of users.

In step S204, the controller 15 transmits the generated recommendation message. The controller 15 may transmit the recommendation message to the terminal apparatus 20 and the output apparatus 50 or the like. Upon receiving the recommendation message, the terminal apparatus 20, the output apparatus 50, and the like output the received recommendation message.

As described above, in the information processing apparatus 10 according to the present embodiment, the controller 15 extracts a particular action, from the acquired action data, that is action data indicating a worsening of the relationship among the plurality of users. The controller 15 also identifies a cause pattern that includes at least one piece of action data, among the action data acquired before the extracted particular action, that is associated with the particular action. The information processing apparatus 10 according to the present embodiment can therefore identify actions that lead to a worsening of the relationship among a plurality of users as a cause pattern.

As described above, the cause pattern may include a combination of a plurality of pieces of action data. By thus identifying a cause pattern that includes a combination of a plurality of pieces of action data, the information processing apparatus 10 according to the present embodiment can identify a combination, of a plurality of actions, of which the users are unaware but which is likely to lead to a worsening of the relationship among the users, for example.

The present disclosure is not limited to the embodiments described above. For example, a plurality of blocks described in the block diagrams may be integrated, or a block may be divided. Instead of executing the plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, some of the processing operations executed in the information processing apparatus 10 in the above embodiment may be executed in the terminal apparatuses 20, the camera 30, the audio input apparatus 40, or the output apparatus 50.

For example, a configuration that causes a general purpose electronic device such as a smartphone, a computer, or the like to function as the information processing apparatus 10 according to the embodiment described above is possible. Specifically, a program containing processes for realizing the functions of the information processing apparatus 10 or the like according to an embodiment may be stored in a memory of the electronic device, and the program may be read and executed by a processor of the electronic device. Accordingly, in an embodiment, the present disclosure can also be implemented as a program executable by a processor.

For example, although the audio input apparatus 40 and the output apparatus 50 have been described as independent devices in the above embodiments, the audio input apparatus 40 and the output apparatus 50 may be an integrated device. The audio input apparatus 40 and the output apparatus 50 may, for example, be an integrated smart speaker.

For example, the information processing apparatus 10 described in the above embodiment may be installed in the residence 2.

An example in which the cause pattern includes a combination of a plurality of pieces of action data has been described in the above embodiment, but the cause pattern may, for example, instead include only one piece of action data.

An example in which there are two users in the residence 2 has been described in the above embodiment, but the number of users in the residence 2 may be one, for example, or the number may be three or more.

The invention claimed is:

1. An information processing apparatus comprising a controller configured to:
   acquire action data on a plurality of users;
   extract, from the acquired action data, a particular action that is action data indicating a worsening of a relationship among the plurality of users in a same building; and
   identify a cause pattern that includes at least one piece of action data, among pieces of action data acquired before the particular action, associated with the particular action, wherein the action data includes image data obtained by a camera configured to image a plurality of users, audio data obtained by an audio input apparatus configured to detect voices among the plurality of users, and SNS data obtained by the information processing apparatus, wherein:
   the cause pattern comprises a combination of plurality of pieces of action data; and
   the controller identifies the combination of the plurality of pieces of action data as the cause pattern when a probability of the particular action being triggered is equal to or greater than a predetermined threshold after the combination of the plurality of pieces of action data is acquired.

2. The information processing apparatus of claim 1, wherein the cause pattern comprises a combination of a plurality of pieces of action data.

3. The information processing apparatus of claim 2, wherein the combination of the plurality of pieces of action data is order dependent.

4. The information processing apparatus of claim 1, wherein the controller is configured to generate, upon acquiring the action data included in the cause pattern, a message that recommends avoiding the worsening of the relationship among the plurality of users.

5. The information processing apparatus of claim 4, wherein the controller is configured to cause a terminal apparatus of at least one user among the plurality of users to output the generated message.

6. The information processing apparatus of claim 4, wherein the controller is configured to cause an output apparatus, configured to output information that can be perceived by each user among the plurality of users, to output the generated message.

7. The information processing apparatus according to claim 1, wherein the controller identifies the cause pattern in association with time.

8. An information processing system comprising:
   the information processing apparatus of claim 1; and
   a camera and/or an audio input apparatus for detecting the action data.

9. A non-transitory computer readable medium storing a program configured to cause a computer to execute operations comprising:
   acquiring action data on a plurality of users in a same building;
   extracting, from the acquired action data, a particular action that is action data indicating a worsening of a relationship among the plurality of users; and
   identifying a cause pattern that includes at least one piece of action data, among pieces of action data acquired before the particular action, associated with the particular action, wherein the action data includes image data obtained by a camera configured to image a plurality of users, audio data obtained by an audio input apparatus configured to detect voices among the plurality of users, and SNS data obtained by an information processing apparatus, wherein:
   the cause pattern comprises a combination of plurality of pieces of action data; and
   the controller identifies the combination of the plurality of pieces of action data as the cause pattern when a probability of the particular action being triggered is equal to or greater than a predetermined threshold after the combination of the plurality of pieces of action data is acquired.

10. The non-transitory computer readable medium of claim 9, wherein the cause pattern comprises a combination of a plurality of pieces of action data.

11. The non-transitory computer readable medium of claim 10, wherein the combination of the plurality of pieces of action data is order dependent.

12. The non-transitory computer readable medium of claim 9, wherein the operations further comprise generating, upon acquiring the action data included in the cause pattern, a message that recommends avoiding the worsening of the relationship among the plurality of users.

13. The non-transitory computer readable medium of claim 12, wherein the operations further comprise causing a terminal apparatus of at least one user among the plurality of users to output the generated message.

14. An information processing method for an information processing apparatus, the information processing method comprising:
    acquiring action data on a plurality of users in a same building;
    extracting, from the acquired action data, a particular action that is action data indicating a worsening of a relationship among the plurality of users; and
    identifying a cause pattern that includes at least one piece of action data, among pieces of action data acquired before the particular action, associated with the particular action, wherein the action data includes image data obtained by a camera configured to image a plurality of users, audio data obtained by an audio input apparatus configured to detect voices among the plurality of users, and SNS data obtained by the information processing apparatus, wherein:
    the cause pattern comprises a combination of plurality of pieces of action data; and
    the controller identifies the combination of the plurality of pieces of action data as the cause pattern when a probability of the particular action being triggered is equal to or greater than a predetermined threshold after the combination of the plurality of pieces of action data is acquired.

15. The information processing method of claim 14, wherein the cause pattern comprises a combination of a plurality of pieces of action data.

16. The information processing method of claim 15, wherein the combination of the plurality of pieces of action data is order dependent.

17. The information processing method of claim 14, further comprising generating, upon acquiring the action data included in the cause pattern, a message that recommends avoiding the worsening of the relationship among the plurality of users.

18. The information processing method of claim 17, further comprising causing a terminal apparatus of at least one user among the plurality of users to output the generated message.

* * * * *